United States Patent
Eoll

[11] Patent Number: 6,059,224
[45] Date of Patent: May 9, 2000

[54] METHOD AND APPARATUS FOR GUIDING FIBERS OR RIBBONS UNDER TENSION

[75] Inventor: Christopher K. Eoll, Hickory, N.C.

[73] Assignee: Siecor Operations, LLC, Hickory, N.C.

[21] Appl. No.: 09/102,315

[22] Filed: Jun. 22, 1998

[51] Int. Cl.[7] .......................... B65H 23/04; B65H 57/00; G03B 1/42
[52] U.S. Cl. ............................................................ 242/615
[58] Field of Search ................................ 242/615, 615.2, 242/566, 157 R

[56] References Cited

U.S. PATENT DOCUMENTS

| | | |
|---|---|---|
| 4,027,814 | 6/1977 | Gloge et al. . |
| 4,446,686 | 5/1984 | Pamuska et al. ............................ 57/6 |
| 4,585,406 | 4/1986 | Ravela ...................................... 425/113 |
| 4,696,542 | 9/1987 | Thompson . |
| 4,720,165 | 1/1988 | Tokuda et al. ........................ 350/96.24 |
| 4,761,979 | 8/1988 | Kawaguchi et al. . |
| 4,812,001 | 3/1989 | Tomita et al. . |
| 5,595,354 | 1/1997 | Josoff ....................................... 242/364 |
| 5,818,982 | 6/1998 | Voss et al. . |

OTHER PUBLICATIONS

JP–A–10170787; Dec. 6, 1996; Patent Abstracts of Japan.

Walter D. Pilkey, Formulas for Stress Strain and Structural Matrices, ISBN 0–471–52746–7, pp. 107, 776–777, 790–791, 1994.

*Primary Examiner*—Donald P. Walsh
*Assistant Examiner*—Collin A. Webb
*Attorney, Agent, or Firm*—Timothy J. Aberle

[57] ABSTRACT

A method and apparatus for guiding a length of material such as optical fibers or optical fiber ribbons under tension in a fiber optic cable or ribbon manufacturing method. A first embodiment of the present invention requires that certain radii of curvature be maintained or exceeded for either the optical fiber or optical fiber ribbon. In a second embodiment of the present invention, the guide for the length of material is required to conform to a guiding surface.

43 Claims, 5 Drawing Sheets

METHOD AND APPARATUS FOR GUIDING FIBERS OR RIBBONS UNDER TENSION

BACKGROUND OF THE INVENTION

1. Technical Field

This invention relates generally to processing of optical fiber and, more particularly, to methods and apparatuses for guiding optical fibers or optical fiber ribbons under tension in a fiber optic ribbon or cable manufacturing process.

2. Related Art

Manufacturers of fiber optic ribbons or cables, have faced the problem of fiber breaks, and fiber coating and/or ribbon matrix damage during processing of the optical fibers. This breakage/damage is attributable to a number of activities conducted during the processing which generally includes the feeding of optical fiber together. For instance, see U.S. Pat. No. 4,720,165 to Tokuda, et al., incorporated herein by reference. As shown in Tokuda, et al., these processes oftentimes require the fiber(s) or ribbon(s) to be held in tension along their length and to be bent over a variety of guides such as rollers, roller sheaves, and/or stationary members.

One problem which causes fiber breaks, or matrix/coating damage (hereinafter "breakage/damage") is the bending radii of the length of material, i.e., fiber or ribbon, being chosen incorrectly. In particular, the bending radii being excessively small or large can be a problem. First, glass breakage can occur where a length of material is to be supported on a guide at a point or line, i.e., draped over the guide and not touching extensively. In this instance, the length of material bends too much where it passes over the guide because of an over demanding turn angle or excessive tension being applied to the length of material. Second, coating or matrix damage can occur when the turn angle or tension of the length of material is too small for the length of material to conform to the curvature of a guide which is meant to support the length of material on a surface so as to avoid point or line contact with the length of material.

In either problem creating scenario, engineers who create the equipment and processes oftentimes do not know the radii of curvature to which a fiber or ribbon is being exposed. Accordingly, if acceptable bend radii are provided, it is by happenstance. Unfortunately, unacceptable bend radii are also unknowingly incorporated into the set-up. As a further consequence, because the breakage/damage to the fiber may occur in many other ways, a problem created by incorrect bending may not be readily noticeable. Engineers therefore are unlikely to be able to ascertain that the breakage/damage problem is created by a bend radius issue.

For the above reasons, there exists a need for a method of intentional preparation for bending of the fiber or ribbon under tension during the manufacturing processes regardless of whether the problem arises when the length of material is supported on a guide surface or when a guide supports the length of material at a point or line. Further, there is a need for an apparatus which uses equipment that exhibits conformance with appropriate bend radii criteria while guiding a length of material under tension.

SUMMARY OF THE INVENTION

In a first general aspect in accordance with the present invention is provided an apparatus for guiding a length of material under tension having at least one material guide having contact with the length of material in a contact region and wherein the length of material has a radius of curvature over the guide greater than or equal to a predetermined value, wherein the radius of curvature is:

$$\sqrt{\frac{EI}{2T(1-\cos\Theta)}}$$

Wherein, T is the tension of the material, $\Theta$ is the angle between a straight path of the material at a remote distance from the contact region and a tangent to the material at the contact region, E is Young's modulus of the material, and I is the moment of inertia of the length of material. In this aspect, the contact region is either a point or line. The predetermined value is calculated as: $r/\epsilon$, where r is the radius of the length of material and $\epsilon$ is the fiber proof testing strain of the length of material. The predetermined value preferably also includes a safety factor as desired by the user. This first aspect provides a fiber optic cable or ribbon manufacturing device which conforms to minimum allowable fiber bend radii over a point or line contact region created at a guide while guiding the fiber or ribbon under tension.

In a second general aspect of the present invention a method of guiding lengths of material under tension includes the steps of; providing a guide to support the length of material; and guiding the length of material over the guide such that a radius of curvature of the length of material over the guide is greater than or equal to a predetermined value, wherein the radius of curvature is:

$$\sqrt{\frac{EI}{2T(1-\cos\Theta)}}$$

Wherein T is the tension of the material, $\Theta$ is the angle between a straight path of the material at a remote distance from the contact region and a tangent to the material at the contact region, E is Young's modulus of the material, and I is the moment of inertia of the length of material. In this aspect, the contact region is a point or line. The predetermined value can be calculated as: $r/\epsilon$, where r is the radius of the length of material and $\epsilon$ is the fiber proof testing strain of the length of material. This aspect further includes controlling the bend angle of the length of material over the guide and the tension in the length of material so that the radius of curvature meets the predetermined value. This aspect has advantages similar to the first aspect in providing a process to assure that fiber bend radii which cause breaks are stricken from the manufacturing process.

In a third general aspect in accordance with the present invention is provided an apparatus for guiding a length of material under tension having at least one material guide having contact with the length of material at a contact area, each guide having a radius of curvature greater than:

$$\sqrt{\frac{EI}{2T(1-\cos\Theta)}}$$

Wherein T is the tension of the material, $\Theta$ is the angle between a straight path of the material at a remote distance from the contact area and a tangent to the material at the center of the contact area, E is Young's modulus of the material, and I is the moment of inertia of the length of material. This aspect provides an apparatus having at least one guide engineered to provide an acceptable radius of curvature on the guide surface to prevent breakage/damage to the length of material. In particular, this aspect prevents the creation of a point contact between a guide surface area and the length of material where extensive smooth surface to material contact is required. Thus, the aspect avoids localized crushing forces which could damage the fiber matrix or coating.

In a fourth general aspect in conformity with the present invention is provided a method of guiding lengths of material under tension having the steps of: providing a guide to support the length of material at a contact area, the guide having a radius of curvature greater than:

$$\sqrt{\frac{EI}{2T(1-\cos\Theta)}}$$

and moving the length of material over the guide. Wherein T is the tension of the material, Θ is the angle between a straight path of the material at a remote distance from the contact area and a tangent to the material at the center of the contact area, E is Young's modulus of the material, and I is the moment of inertia of the length of material. This aspect has the same advantages as the third aspect in providing a process that assures acceptable radius of curvature on fiber or ribbon guides. In particular, extensive surface to material contact is provided.

In a fifth general aspect in accordance with the present invention is provided a guide for guiding a length of material under tension having a contact surface having contact with the length of material at a contact area and a radius of curvature greater than:

$$\sqrt{\frac{EI}{2T(1-\cos\Theta)}}$$

Wherein T is the tension of the material, Θ is the angle between a straight path of the material at a remote distance from the contact area and a tangent to the material at the center of the contact area, E is Young's modulus of the material, and I is the moment of inertia of the length of material. This aspect has the same advantages as the third aspect in providing a guide having an acceptable radius of curvature, and an extensive surface to material contact.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIGS. 3a–3c show an exploded view of details of the second embodiment in accordance with the present invention.

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an examples of the preferred embodiments.

Figure 1:
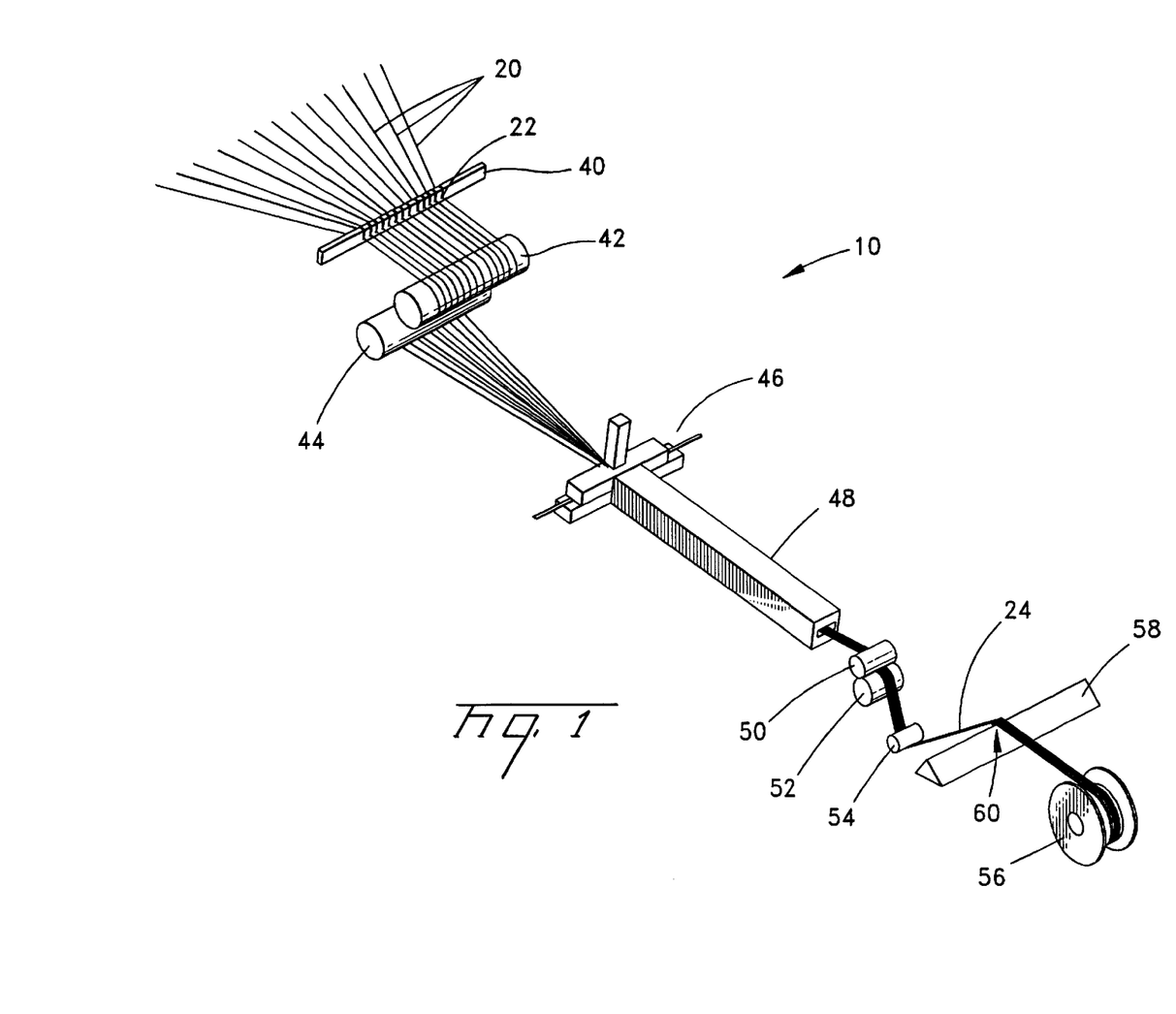
FIG. 1 shows a fiber optic ribbon manufacturing device in accordance with a first embodiment of the present invention.

Referring now to the drawings, FIG. 1 shows an exemplary fiber optic ribbon manufacturing device 10 in which the teachings in accordance with a first embodiment of the present invention may be used. It is important to note, however, that while the present invention will be described in conjunction with a ribbon manufacturing device 10 that the teachings of the invention are applicable to other fiber optic manufacturing and handling devices which need to support or guide lengths of material or fibers under tension during use, for example, rewind line devices, proof testing line devices, fiber stranding devices, ribbon stranding devices, ribbon making devices, fiber buffering devices, ribbon buffering devices, or etc. Accordingly, the scope of the invention is not limited to the ribbon manufacturing device 10 described hereafter. Further, the present invention has application with glass or plastic optical fibers or glass or plastic optical fiber ribbons which may have coatings of other materials. All of the possible type of fibers or ribbons will be referred to herein as lengths of material for convenience. In other words, length of material is the glass or plastic optical fiber core of an optical fiber or ribbon which may have coatings of other materials. It should be appreciated therefore that the teachings of the present invention should not be limited to simply optical fibers as the apparatuses and methods described herein can apply to any length of material having similar properties.

Returning to FIG. 1, the ribbon manufacturing device 10 acts to combine a number of optical fiber elements 20 into an optical fiber ribbon 24. Device 10 includes an arrangement guide 40 through which aligned optical fibers 22 extend, a pair of feed rollers 42,44, a gathering tool 46, an adhesive solidifier 48, a pair of nip rollers 50,52, a guide roller 54, and a guide member 58. Ribbon 24 produced by device 10 is collected on a drum 56 for ease of transport.

Lengths of material, i.e., optical fibers 20 or optical fiber ribbon 24, contact a number of different guide members, e.g., roller 42 and member 58, during the progression through device 10. At each respective member, length of material 20 bends to some degree over the member. During manufacturer use, length of material 20,24 is therefore subject to potential breakage/damage if bent to an inappropriate radius. Further, breakage/damage can occur to the coating and/or the ribbon matrix of the material if inappropriate bending occurs. Adding additional strain to length of material 20,24 is the possibility that the material may also be stranded in alternating hand orientations such as SZ stranding. Further, additional strain may be added where lengths of material 20 are formed into a slotted core ribbon (SCR) having a plastic cylindrical core with grooves thereon into which the lengths of material are set. The grooves may also include an alternating hand orientation.

Figure 2:
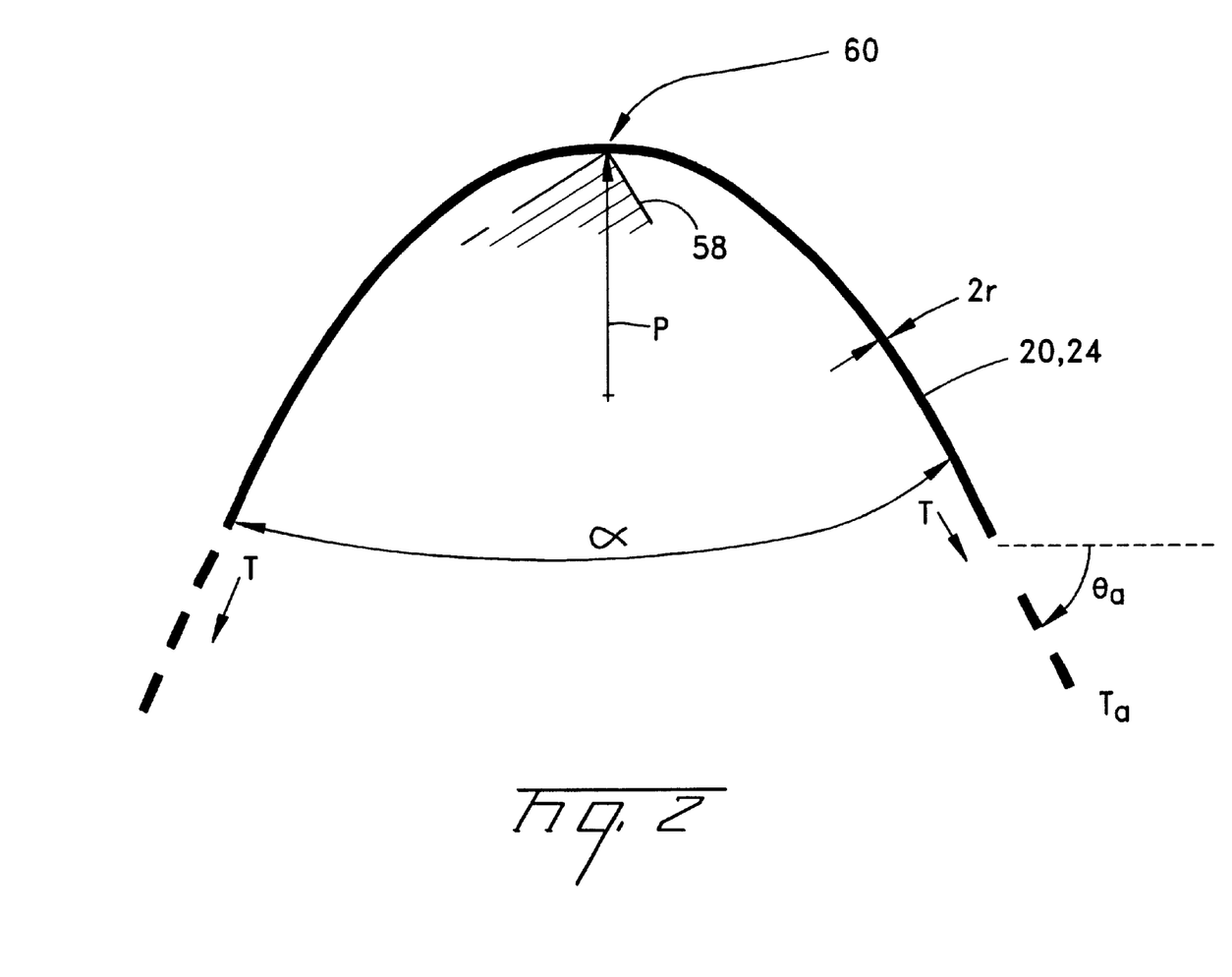
FIG. 2 shows an explode views of a detail of the first embodiment in accordance with the present invention.

To prevent breakage/damage due to bending over guides, the invention provides a novel apparatus and method of guiding a length of material under tension. Referring to FIG. 2, the method and apparatus for preventing breakage/damage in length of material 20,24 in accordance with a first embodiment will be described. In FIG. 2, length of material 20,24 is shown guided over a stationary guide 58. Length of material 20,24 contacts guide 58 at a point or line contact region 60 depending on whether the length of material is a line, e.g., an optical fiber 20, or a wide band, e.g., an optical fiber ribbon 24. Length of material 20 is held in tension T at both ends and forms an angle α over guide 58.

In accordance with the first embodiment, it has been discovered that the radius of curvature ρ at contact region 60 in the plane defined by the path of length of material 20 over guide 58 can be calculated such that:

$$\rho = \sqrt{\frac{EI}{2T(1-\cos\Theta)}}$$

Where T is the tension of length of material 20 pounds force, E is Young's modulus of the material in psi, and I is the moment of inertia of the length of material in in$^4$. The angle Θ is the angle, in radians, between a straight path (as depicted by shifted line a in FIG. 3) of length of material 20 at a remote distance from contact region 60 and a tangent (as depicted by line b in FIG. 3) at the contact region 60. The term EI is the flexural rigidity of length of material 20 or of one of the fibers in length of material 24. Where the length of material is a ribbon 24 and therefore has a number of optical fibers therein, the tension T used is the tension per fiber of the ribbon, i.e., the overall tension divided by the number of fibers in the ribbon.

Of note, if the coating is ignored since the glass or plastic in the fiber is a homogenous cylinder when the coating is ignored, the moment of inertia I can be expressed as: $\Pi r^4/4$. The term r being the radius of length of material 20 in inches (in.) The equation would then be:

$$\rho = \sqrt{\frac{E\pi r^4}{8T(1-\cos\Theta)}}$$

Further, in accordance with the first embodiment, the radius of curvature ρ must equal or exceed a predetermined value. The predetermined value can be calculated in a variety of ways. Preferably, the predetermined value is a function of the radius of length of material 20 and the fiber proof testing strain ε to prevent material breakage/damage. Most preferably, the predetermined value is calculated by dividing the radius r of the length of material 20 by the acceptable strain level ε of length of material 20. Overall, then, $\rho \geq r/\epsilon$. It has been found, in accordance with the first embodiment of the present invention, that this predetermined value assures that breakage will not occur as length of material 20,24 is guided over a guide.

Acceptable strain level ε is determined based on the fiber proof testing strain of length of material 20,24. The fiber proof testing strain is based on the fiber proof testing stress σ divided by the Young's modulus E of the material, such that $\epsilon \cdot \sigma/E$. The fiber proof testing stress σ is the level of stress the entire length of material 20,24 is subject to after manufacturing in order to eliminate especially weak areas. Typically, the fiber proof testing stress is in the range of 50 to 250 kpsi, and is preferably about 100 kpsi. Where the length is coated with a jacket, the Young's modulus used may be that of the glass or plastic length of material 20,24 within the plastic jacket as a good approximation. If desired, a safety factor sf may also be added into the formula through strain value ε by multiplying the strain ε by the safety factor sf. The safety factor may be any value which the user desires, e.g., 40%. If a safety factor sf is used, the overall equation becomes: $\rho \geq r/((sf)\epsilon)$ or, substituting $\epsilon = \sigma/E$, $\rho \geq rE/((sf)\sigma)$.

To illustrate application of this criteria, assume a given length of material 20 has a radius of 0.00246 in., a proof stress of 100 kpsi, a Young's modulus of 10,000 kpsi, and that a safety factor of 40% is desired. The minimum radius of curvature that must be maintained to prevent breakage in length of material 20 is calculated as:

$$\rho \geq (0.00246 \text{ in} \times 10,000 \text{ kpsi.})/(0.4 \times 100 \text{ kpsi}) \geq 0.615 \text{ in.}$$

Since the actual radius of curvature ρ of the length of material 20 can be calculated as:

$$\rho = \sqrt{\frac{EI}{2T(1-\cos\Theta)}}$$

the method in accordance with the first embodiment includes providing a guide to support length of material 20, and guiding the length of material over the guide such that radius of curvature of length of material 20 over the guide as calculated by:

$$\sqrt{\frac{EI}{2T(1-\cos\Theta)}}$$

is greater than or equal to the predetermined value. The predetermined value being preferably calculated as: r/ε, and possibly including a safety factor sf. If the length of material were an optical fiber ribbon 24 then the radius of curvature of each fiber within the ribbon must meet or exceed the minimum radius of curvature described above.

In order to meet the above criteria, a variety of mechanisms may be used in accordance with the first embodiment. For instance, with regard to FIG. 2 where length of material 20,24 contacts guide 58 at a point or line contact region 60, the tension T and angle α are maintained to assure the predetermined value is met or exceeded. The method in accordance with the first embodiment, therefore, may further include the step of controlling the bend angle of the length of material over the guide and the tension in the length of material to meet the above-explained criteria.

Figure 3A:
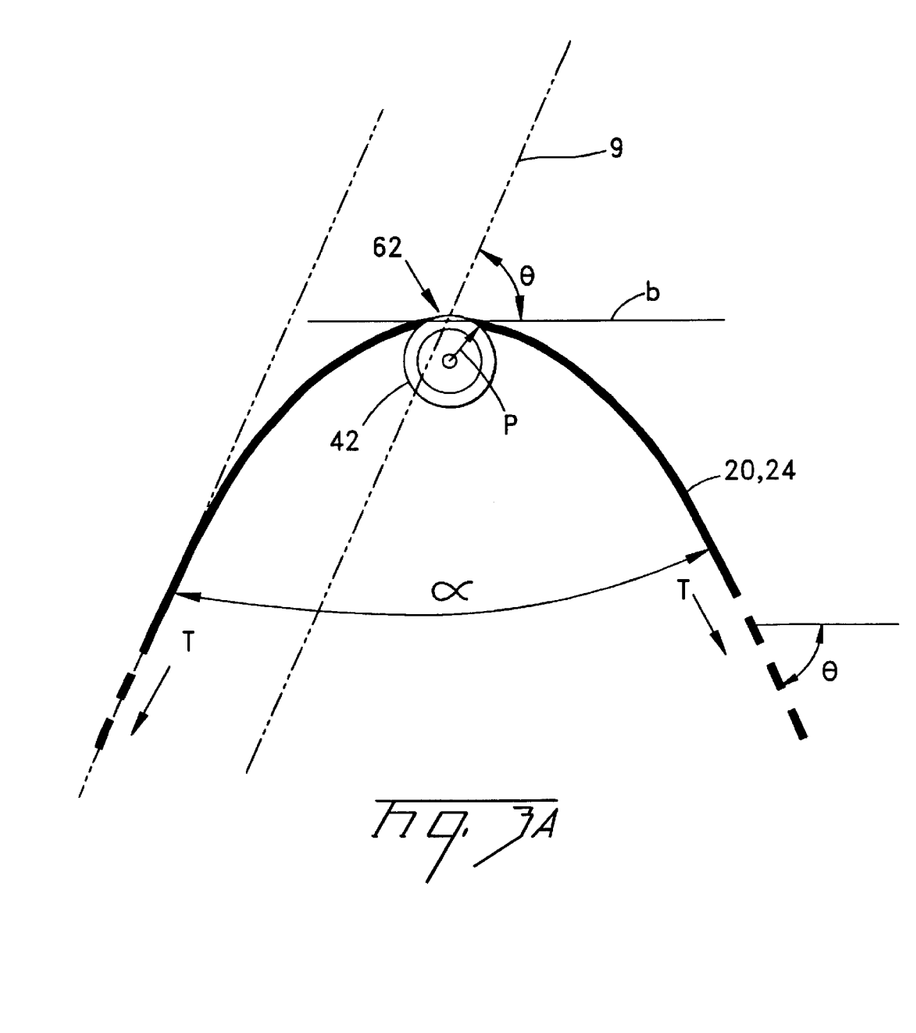
Figure 3B:
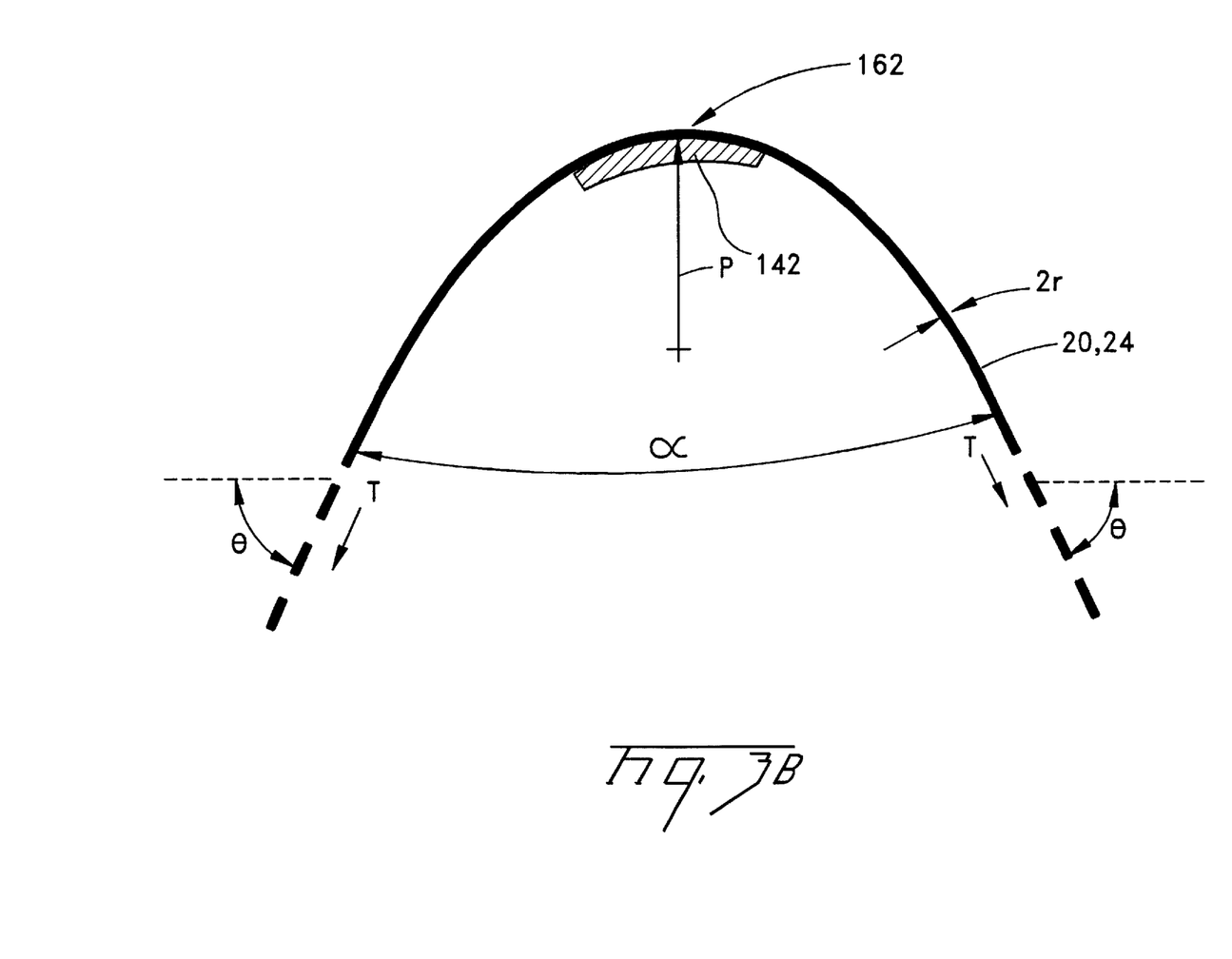
Figure 7C:
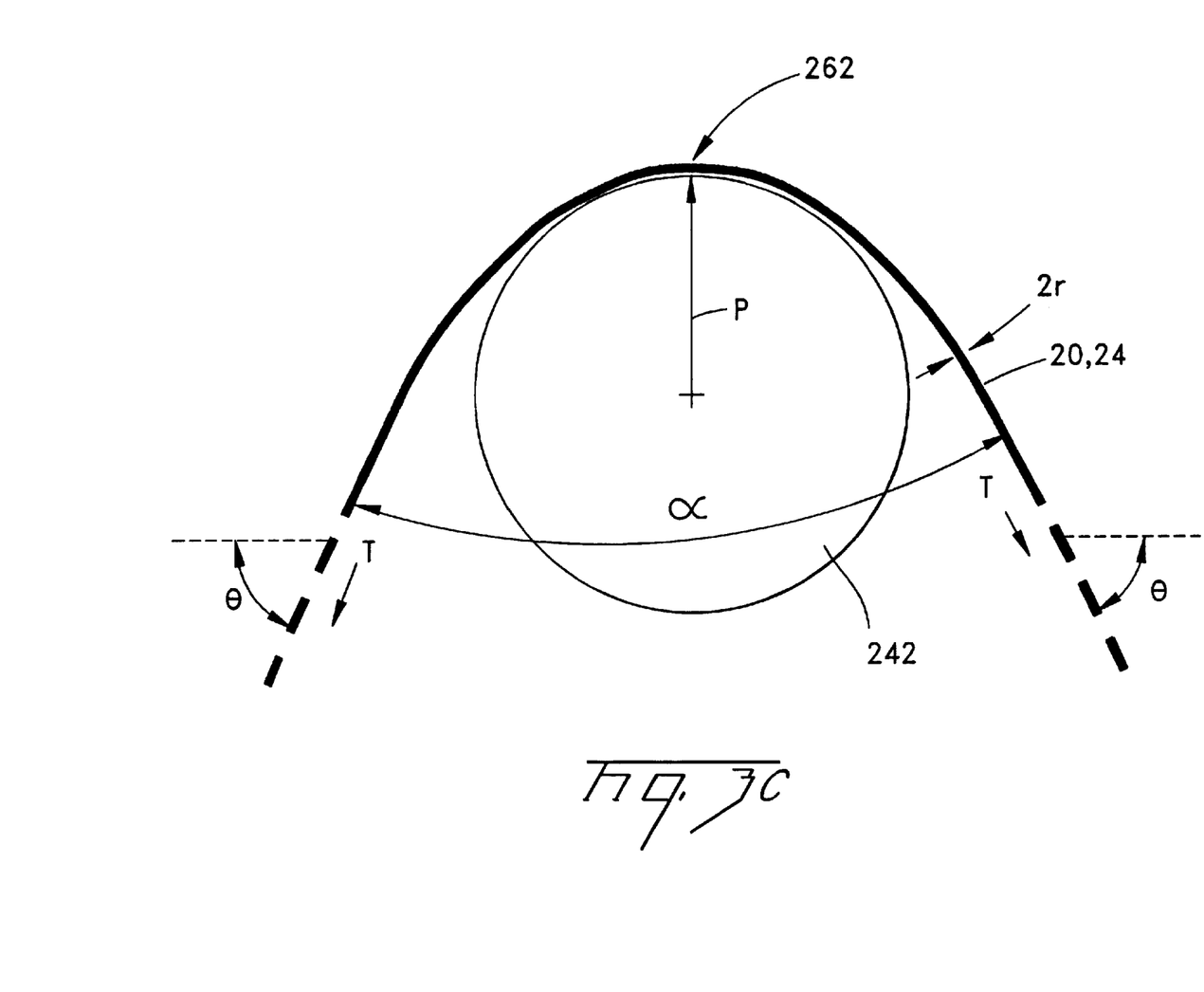

Turning to FIGS. 3a–3c, a method and apparatus in accordance with the second embodiment will be described. FIG. 3a depicts a guide 42 provided as a roller such that length of material 20,24 contacts guide 42 at a surface contact area 62. Hence, the structure of guide 42 may aid in supporting length of material 20,24. Guide 42, however, in accordance with the second embodiment can be any structure which assures the minimum radius of curvature ρ through structure independent of or in conjunction with maintenance of the tension T and angle α. Further, guide 42 should support length of material 20,24 such that length of material 20,24 conforms to surface contact area 62 of guide 42, i.e., guide 42 includes contact area for length of material 20,24 that is a surface rather than a point or line. For example, the guide could be a curved plate 142 upon which length of material 20,24 rests on surface 162 as illustrated in FIG. 3b, or an enlarged roller 242 upon which length of material rests on surface 262 as illustrated in FIG. 3$_c$. Further, guide 42 can be any guide within an apparatus as exemplified by device 10 of FIG. 1, e.g., a roller, sheave, plate, or etc.

In accordance with the second embodiment, the radius of curvature R of guide 42 is to exceed;

$$\sqrt{\frac{EI}{2T(1-\cos\Theta)}}$$

Where T is the tension of length of material 20 in pounds force, E is Young's modulus of the material in psi, and I is the moment of inertia of the length of material in in$^4$. The angle $\Theta$ is the angle, in radians, between a straight path (as depicted by shifted line a in FIG. 3) of length of material 20 at a remote distance from contact area 62 and a tangent (as depicted by line b in FIG. 3) at the center of contact area 62. The term EI is the flexural rigidity of length of material 20.

Stated in another way, when it is permissible to ignore the coating, the radius of curvature must exceed:

$$\sqrt{\frac{E\pi r^4}{8T(1-\cos\Theta)}}$$

Here, values E, T and $\Theta$ remain described above. However, as also noted above, since the fiber, when the coating is ignored, is a homogenous glass or plastic cylinder, then the moment of inertia I can be expressed as: $\Pi r^4/4$. Where r is the radius of the length of material 20 in inches (in.)

If the length of material is a ribbon 24, the presence of more than one fiber is compensated for by focusing on any single fiber within the ribbon. This is done by dividing the ribbon tension by the number of fibers in the ribbon to determine the fiber tension T. Further, as in the first embodiment, a safety factor sf may be multiplied into the equation, e.g., a safety factor of 2, to assure that the above-identified relation is not violated if an unintentional drop in tension occurs.

The second embodiment of the present invention includes the method of guiding lengths of material 20,24 under tension T with a guide 42 to support length of material 20, 24 at a contact area 62, the guide 42 having a radius of curvature greater than:

$$\sqrt{\frac{EI}{2T(1-\cos\Theta)}}$$

and moving length of material 20,24 over guide 42. The invention in accordance with the second embodiment also includes an apparatus for guiding length of material 20,24 under tension T having at least one material guide having contact with length of material 20,24 at a contact area 62, each guide having a radius of curvature greater than the value calculated by the above-noted equation. Further, the invention also includes the individual guides conforming to or exceeding the above-described criteria.

Overall, the present invention provides a method and apparatus for guiding lengths of material 20,24 under tension T such that lengths of material 20,24 will not be broken/damaged as they pass over a guide.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. For instance, the present invention is applicable to any equipment that handles fiber or ribbon moving through a manufacturing line under tension, e.g., rewind line devices, proof testing line devices, fiber stranding devices, ribbon stranding devices, ribbon making devices, fiber buffering devices, ribbon buffering devices, or etc. Additionally, the present inventions are applicable to glass and plastic optical fibers or ribbons.

I claim:

1. An apparatus for guiding a length of material under tension, the apparatus comprising:

at least one material guide having contact with the length of material in a contact region and wherein the length of material has a radius of curvature over the guide greater than or equal to a predetermined value, wherein the radius of curvature is:

$$\sqrt{\frac{EI}{2T(1-\cos\Theta)}}$$

wherein T is the tension of the material,
$\Theta$ is the angle between a straight path of the material at a remote distance from the contact region and a tangent at the contact region,
E is Young's modulus of the material, and
I is the moment of inertia of the length of material.

2. The apparatus of claim 1, wherein the moment of inertia for the length of material is equivalent to: $\Pi r^4/4$, wherein r is the is the radius of the length of material at the contact region.

3. The apparatus of claim 1, wherein the guide is one of a roller, rotating sheave and stationary surface.

4. The apparatus of claim 1, wherein the length of material is an optical fiber.

5. The apparatus of claim 1, wherein the length of material is an optical fiber ribbon and the tension T is the tension per fiber of the ribbon.

6. The apparatus of claim 1, wherein the predetermined value is a function of the radius of the length of material and the fiber proof testing strain for preventing material breakage/damage.

7. The apparatus of claim 6, wherein the predetermined value also includes a safety factor.

8. The apparatus of claim 6, wherein the predetermined value is: $r/\epsilon$, where r is the radius of the length of material at the contact region and $\epsilon$ is the fiber proof testing strain of the length of material.

9. The apparatus of claim 8, wherein the fiber proof testing strain is: $\sigma/E$, where $\sigma$ is the fiber proof testing stress and E is the Young's modulus of the material.

10. The apparatus of claim 9, wherein the fiber proof testing stress $\sigma$ is in the range of 50 to 250 kpsi.

11. The apparatus of claim 10, wherein the fiber proof testing stress $\sigma$ is 100 kpsi.

12. A method of guiding lengths of material under tension, the method comprising the steps of:

providing a guide to support the length of material; and guiding the length of material over the guide such that a radius of curvature of the length of material over the guide is greater than or equal to a predetermined value, wherein the radius of curvature is:

$$\sqrt{\frac{EI}{2T(1-\cos\Theta)}}$$

wherein T is the tension of the material,
Θ is the angle between a straight path of the material at a remote distance from the contact region and a tangent at the contact region,
E is Young's modulus of the material, and
I is the moment of inertia of the length of material.

13. The method of claim 12, wherein the step of guiding the length of material over the guide such that a radius of curvature of the length of material over the guide is greater than or equal to a predetermined value includes controlling the bend angle of the length of material over the guide and the tension in the length of material.

14. The method of claim 12, wherein the step of providing a guide includes providing one of a roller, rotating sheave and stationary surface.

15. The method of claim 12, wherein the length of material is an optical fiber.

16. The method of claim 12, wherein the length of material is an optical fiber ribbon and the tension T is the tension per fiber of the ribbon.

17. The method of claim 12, wherein the moment of inertia for the length of material is equivalent to: $\Pi r^4/4$, wherein r is the radius of the length of material at the contact region.

18. The method of claim 12, wherein the predetermined value is a function of the radius of the length of material and the fiber proof testing strain for preventing material breakage/damage.

19. The method of claim 18, wherein the predetermined value also includes a safety factor.

20. The method of claim 18, wherein the predetermined value is: $r/\epsilon$, where r is the radius of the length of material at the contact region and $\epsilon$ is the fiber proof testing strain of the length of material.

21. The method of claim 20, wherein the fiber proof testing strain is: $\sigma/E$, where $\sigma$ is the fiber proof testing stress and E is the Young's modulus of the material.

22. The method of claim 21, wherein the fiber proof testing stress $\sigma$ is in the range of 50 to 250 kpsi.

23. The method of claim 22, wherein the fiber proof testing stress $\sigma$ is 100 kpsi.

24. An apparatus for guiding a length of material under tension, the apparatus comprising:
at least one material guide having contact with the length of material at a contact area, each guide having a radius of curvature greater than:

$$\sqrt{\frac{EI}{2T(1-\cos\Theta)}}$$

wherein T is the tension of the material,
Θ is the angle between a straight path of the material at a remote distance from the contact area and a tangent at the center of the contact area,
E is Young's modulus of the material, and
I is the moment of inertia of the length of material.

25. The apparatus of claim 24, wherein the guide is one of a roller, rotating sheave and stationary surface.

26. The apparatus of claim 24, wherein the length of material is an optical fiber.

27. The apparatus of claim 24, wherein the length of material is an optical fiber ribbon and the tension T is the tension per fiber of the ribbon.

28. The apparatus of claim 24, wherein the guide is on a rewind line device.

29. The apparatus of claim 24, wherein the guide is on a proof testing line device.

30. The apparatus of claim 24, wherein the guide is on one of a fiber stranding device and a ribbon stranding device.

31. The apparatus of claim 24, wherein the guide is on a ribbon making device.

32. The apparatus of claim 24, wherein the guide is on one of a fiber buffering device and a ribbon buffering device.

33. The apparatus of claim 24, wherein the moment of inertia for the length of material is equivalent to: $\Pi r^4/4$, wherein r is the is the radius of the length of material.

34. A method of guiding lengths of material under tension, the method comprising the steps of:
providing a guide to support the length of material at a contact area, the guide having a radius of curvature greater than:

$$\sqrt{\frac{EI}{2T(1-\cos\Theta)}}$$

wherein T is the tension of the material,
Θ is the angle between a straight path of the material at a remote distance from the contact area and a tangent at the center of the contact area,
E is Young's modulus of the material, and
I is the moment of inertia of the length of material; and
moving the length of material over the guide.

35. The method of claim 34, wherein the step of providing a guide includes providing one of a roller, rotating sheave and stationary surface.

36. The method of claim 34, wherein the length of material is an optical fiber.

37. The method of claim 34, wherein the length of material is an optical fiber ribbon and the tension T is the tension per fiber of the ribbon.

38. The method of claim 34, wherein the moment of inertia for the length of material is equivalent to: $\Pi r^4/4$, wherein r is the radius of the length of material.

39. A guide for guiding a length of material under tension, the guide comprising:
a contact surface having contact with the length of material at a contact area and a radius of curvature greater than:

$$\sqrt{\frac{EI}{2T(1-\cos\Theta)}}$$

wherein T is the tension of the material,
Θ is the angle between a straight path of the material at a remote distance from the contact area and a tangent at the center of the contact area,
E is Young's modulus of the material, and
I is the moment of inertia of the length of material.

40. The guide of claim 39, wherein the guide is one of a roller, rotating sheave and stationary surface.

41. The guide of claim 39, wherein the length of material is an optical fiber.

42. The guide claim 39, wherein the length of material is an optical fiber ribbon and the tension T is the tension per fiber of the ribbon.

43. The guide of claim 39, wherein the moment of inertia for the length of material is equivalent to: $\Pi r^4/4$, wherein r is the is the radius of the length of material.

* * * * *